(12) United States Patent
Xu et al.

(10) Patent No.: US 11,894,992 B2
(45) Date of Patent: Feb. 6, 2024

(54) NETWORK COMPONENT MANAGEMENT METHOD AND NETWORK DEVICE

(71) Applicant: HUAWEI TECHNOLOGIES CO., LTD., Guangdong (CN)

(72) Inventors: Ruiyue Xu, Shanghai (CN); Kai Zhang, Shanghai (CN); Xiaoqian Jia, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/784,773

(22) Filed: Feb. 7, 2020

(65) Prior Publication Data

US 2020/0177473 A1 Jun. 4, 2020

Related U.S. Application Data

(63) Continuation of application No. PCT/CN2018/099163, filed on Aug. 7, 2018.

(30) Foreign Application Priority Data

Aug. 10, 2017 (CN) .......................... 201710682345.3

(51) Int. Cl.
*H04L 41/5009* (2022.01)
*H04L 41/083* (2022.01)
(Continued)

(52) U.S. Cl.
CPC ........ *H04L 41/5009* (2013.01); *H04L 41/083* (2013.01); *H04L 41/0843* (2013.01);
(Continued)

(58) Field of Classification Search
CPC ............... H04L 41/5009; H04L 41/083; H04L 41/0843; H04L 41/5025; H04L 43/0817;
(Continued)

(56) References Cited

U.S. PATENT DOCUMENTS

| 2010/0049851 A1* | 2/2010 | Garrison | ............... G06F 9/5061 709/226 |
| 2011/0173303 A1* | 7/2011 | Rider | .................. G06F 9/44505 709/220 |

(Continued)

FOREIGN PATENT DOCUMENTS

| CN | 106549806 A | 3/2017 |
| CN | 106713406 A | 5/2017 |

(Continued)

OTHER PUBLICATIONS

3GPP TR 28.801 V1.2.0:3GPP 3rd Generation Partnership Project; Technical Specification Group Services and System Aspects; Telecommunicationmanagement; Study on management and orchestration of networkslicing for next generation network(Release 15)', May 2017.

(Continued)

*Primary Examiner* — Karen C Tang
(74) *Attorney, Agent, or Firm* — WOMBLE BOND DICKINSON (US) LLP

(57) ABSTRACT

A network component management method and a network device are disclosed. The method includes: obtaining, by a network component management unit, performance assurance information of a network component, where the performance assurance information includes at least one of the following: key performance information, performance assurance priority information, or performance assurance enabling information, where the key performance information is used to indicate a key performance of the network component, and the performance assurance enabling information is used to instruct to enable or disable at least one performance assurance function of the network component; and managing, by the network component management unit, the network component based on the performance assurance information. The network component management method (Continued)

and the network device provided in the present disclosure can improve network component management efficiency.

12 Claims, 6 Drawing Sheets

(51) Int. Cl.
    *H04L 41/084* (2022.01)
    *H04L 41/5025* (2022.01)
    *H04L 43/0817* (2022.01)
    *H04L 43/0894* (2022.01)
    *H04L 41/0894* (2022.01)

(52) U.S. Cl.
    CPC ...... *H04L 41/5025* (2013.01); *H04L 43/0817* (2013.01); *H04L 43/0894* (2013.01)

(58) Field of Classification Search
    CPC ............. H04L 43/0894; H04L 43/0888; H04L 43/0852; H04L 29/08; H04L 41/0803; H04L 41/0813; H04L 43/062; H04W 24/02; H04W 72/04
    USPC ......................................................... 709/224
    See application file for complete search history.

(56) References Cited

U.S. PATENT DOCUMENTS

| | | | |
|---|---|---|---|
| 2013/0272170 A1* | 10/2013 | Chatterjee | H04W 28/08 370/280 |
| 2016/0127200 A1* | 5/2016 | Dippenaar | G06F 3/0605 709/224 |
| 2017/0094377 A1* | 3/2017 | Herdrich | H04L 41/5009 |
| 2018/0167275 A1* | 6/2018 | Kovacheva | H04L 41/0816 |

FOREIGN PATENT DOCUMENTS

| | | |
|---|---|---|
| CN | 106792739 A | 5/2017 |
| CN | 106792888 A | 5/2017 |
| CN | 106954267 A | 7/2017 |
| WO | 2009059973 A1 | 5/2009 |

OTHER PUBLICATIONS

Orange: "TS 103 195",ETSI Draft; NTECHAFI(17)18_003R1, Europeantelecommunications Standards Institute (ETSI), 650, Routedes Lucioles ; F-06921 Sophia-Antipolis ; France, Apr. 28, 2017 (Apr. 28, 2017), pp. 1-99, XP014293410.

Ngmn Alliance: "5G Network and Service Management includingOrchestration",3GPP DRAFT; 170307.Mar. 25, 2017 (Mar. 25, 2017), XP051248631,total 32 pages.

* cited by examiner

300

```
A service management unit determines performance assurance
information of a network component or performance
assurance indication information of the network component,
where the performance assurance indication information is
used to obtain the performance assurance information, and the
performance assurance information includes at least one of the
following: key performance information, performance
assurance priority information, or performance assurance
enabling information, where the key performance information
is used to indicate a key performance of the network
component, and the performance assurance enabling
information is used to instruct to enable or disable at least one
performance assurance function of the network component
```
— S301

```
The service management unit sends the performance
assurance information or the performance assurance
indication information to a network component management
unit that manages the network component
```
— S302

FIG. 3

NETWORK COMPONENT MANAGEMENT METHOD AND NETWORK DEVICE

CROSS-REFERENCE TO RELATED APPLICATIONS

This application is a continuation of International Patent Application No. PCT/CN2018/099163, filed on Aug. 7, 2018, which claims priority to Chinese Patent Application No. 201710682345.3 filed on Aug. 10, 2017. The disclosures of the aforementioned applications are hereby incorporated by reference in their entireties.

TECHNICAL FIELD

The present disclosure relates to the communications field, and more specifically, to a network component management method and a network device.

BACKGROUND

With rapid development of mobile communications, diversified service requirements need to be met in a future mobile communications system, such as enhanced mobile broadband (eMBB), massive machine-type communications (mMTC), and ultra-reliable and low-latency communication (URLLC). The concept of network slice is proposed in a next generation mobile communications system. A network slicing technology means that a network is logically abstracted as one or more network slices, each network slice includes a series of logical network functions, and one network slice may meet a connection communication service requirement of a type of tenants or a particular tenant. The next generation mobile communications system may include a large quantity of network slices that meet different connection capabilities.

It can be learned from the foregoing that, because there are diversified service requirements and a large quantity of network slices in future communications, a next generation mobile communications system has an increasingly high requirement for network operation and maintenance. Therefore, how to improve network slice management efficiency in managing and maintaining a network slice is an important problem to be urgently resolved in the industry.

SUMMARY

The present disclosure provides a network component management method and a network device, to improve network component management efficiency.

According to a first aspect, a network component management method is provided. The method includes: obtaining, by a network component management unit, performance assurance information of a network component, where the performance assurance information includes at least one of the following: key performance information, performance assurance priority information, or performance assurance enabling information, where the key performance information is used to indicate a key performance of the network component, and the performance assurance enabling information is used to instruct to enable or disable at least one performance assurance function of the network component; and managing, by the network component management unit, the network component based on the performance assurance information.

In this embodiment of the present disclosure, the network component management unit obtains the performance assurance information of the network component. The performance assurance information includes the key performance information, the performance assurance priority information, or the performance assurance enabling information. The network component management unit may manage the network component based on the performance assurance information, thereby improving network component management efficiency.

In one embodiment, the foregoing network component may be a network slice, a network slice subnet, or a network function.

In one embodiment, the obtaining, by a network component management unit, performance assurance information of a network component includes: receiving, by the network component management unit, the performance assurance information; or obtaining, by the network component management unit, a network component template of the network component, where the network component template includes the performance assurance information; or receiving, by the network component management unit, performance assurance reference information of the network component, and obtaining the performance assurance information based on the performance assurance reference information.

In this embodiment of the present disclosure, the network component management unit may obtain the performance assurance information in various manners, so that the obtaining manner is flexible, thereby helping improve network component management efficiency.

In one embodiment, the performance assurance reference information includes at least one of the following: type information of the network component, tenant information corresponding to the network component, service type information corresponding to the network component, or network requirement information of the network component.

In one embodiment, the method further includes: obtaining, by the network component management unit, status information corresponding to the performance assurance information.

In one embodiment, the method further includes: determining, by the network component management unit, current status information of the network component; and determining, by the network component management unit, the performance assurance information based on the status information and the current status information.

In this embodiment of the present disclosure, the status information is used to determine currently used performance assurance information based on a correspondence between the status information and the performance assurance information, so that a dynamic performance assurance method can be provided for network component management, and the network component management unit can perform different optimization and adjustment on the network component based on different situations, thereby improving network component management efficiency and management flexibility.

In one embodiment, the status information includes at least one of the following: time information, user quantity information corresponding to the network component, target event triggering information, or target event monitoring information.

In one embodiment, the managing, by the network component management unit, the network component based on the performance assurance information includes: configuring, by the network component management unit, the performance assurance information in the network component or a managed object of the network component.

In one embodiment, the managing, by the network component management unit, the network component based on the performance assurance information includes: determining, by the network component management unit, at least one to-be-optimized performance of the network component; determining, by the network component management unit, a first performance in the at least one to-be-optimized performance based on the performance assurance information; and optimizing, by the network component management unit, the first performance.

In this embodiment of the present disclosure, the network component management unit detects that a plurality of to-be-optimized performances of the network component need to be optimized. To avoid a conflict in modifying the plurality of performances, the network component management unit may determine the first performance in the plurality of to-be-optimized performances based on the performance assurance information, and modify the first performance. Therefore, a conflict is avoided when the network component is modified.

In one embodiment, the performance assurance information includes the performance assurance priority information, where the performance assurance priority information is used to indicate a priority of at least one performance, the at least one performance includes the at least one to-be-optimized performance, and the determining, by the network component management unit, a first performance in the at least one to-be-optimized performance based on the performance assurance information includes: determining, by the network component management unit based on the performance assurance priority information, a performance that is in the at least one to-be-optimized performance and whose priority meets a preset condition as the first performance.

In this embodiment of the present disclosure, the performance assurance priority information is introduced, to optimize or modify a performance of the network component, thereby assuring the performance of the network component, reducing a performance optimization conflict, and improving network component management efficiency.

In one embodiment, the performance assurance information includes the key performance information, and the determining, by the network component management unit, a first performance in the at least one to-be-optimized performance based on the performance assurance information includes: when the at least one to-be-optimized performance includes the key performance, determining, by the network component management unit, the key performance as the first performance.

In this embodiment of the present disclosure, the key performance information is introduced, to optimize or modify a performance of the network component, thereby assuring the performance of the network component, reducing a performance optimization conflict, and improving network component management efficiency.

In one embodiment, the performance assurance information includes the performance assurance enabling information, and the managing, by the network component management unit, the network component based on the performance assurance information includes: when the performance assurance enabling information is used to enable a first performance assurance function of the network component, enabling, by the network component management unit, the first performance assurance function; or when the performance assurance enabling information is used to disable a second performance assurance function of the network component, disabling, by the network component management unit, the second performance assurance function.

In this embodiment of the present disclosure, the performance assurance enabling information is introduced, to enable and disable a performance assurance function of the network component, thereby assuring a performance of the network component, reducing a performance optimization conflict, and improving network component management efficiency.

In one embodiment, a performance of the network component includes at least one of the following: a bandwidth corresponding to the network component, a latency corresponding to the network component, a throughput corresponding to the network component, a coverage corresponding to the network component, a capacity corresponding to the network component, or a service success rate corresponding to the network component.

According to a second aspect, a network component management method is provided. The method includes: determining, by a service management unit, performance assurance information of a network component or performance assurance reference information of the network component, where the performance assurance reference information is used to obtain the performance assurance information, and the performance assurance information includes at least one of the following: key performance information, performance assurance priority information, or performance assurance enabling information, where the key performance information is used to indicate a key performance of the network component, and the performance assurance enabling information is used to instruct to enable or disable at least one performance assurance function of the network component; and sending, by the service management unit, the performance assurance information or the performance assurance reference information to a network component management unit that manages the network component.

In this embodiment of the present disclosure, the service management unit determines and sends the performance assurance information of the network component or the performance assurance reference information of the network component to the network component management unit, where the performance assurance reference information is used to obtain the performance assurance information, so that the network component management unit manages the network component based on the performance assurance information, thereby improving network component management efficiency.

In one embodiment, the determining, by a service management unit, performance assurance information of a network component or performance assurance reference information of the network component includes: receiving, by the service management unit, service requirement information, and obtaining the performance assurance information or the performance assurance reference information based on the service requirement information.

In this embodiment of the present disclosure, the service management unit may determine the performance assurance information or the performance assurance reference information of the network component based on the service requirement information of the network component, so that the network component management unit manages the network component based on the performance assurance information, thereby improving network component management efficiency.

In one embodiment, the service requirement information includes at least one of the following: a service type, service performance information, service priority information, or tenant information.

In one embodiment, the performance assurance reference information includes at least one of the following: type information of the network component, tenant information corresponding to the network component, service type information corresponding to the network component, or network requirement information of the network component.

In one embodiment, the method further includes: sending, by the service management unit, first information to the network component management unit, where the first information is used to indicate a correspondence between status information and the performance assurance information.

In this embodiment of the present disclosure, the status information is introduced, to determine currently used performance assurance information based on the correspondence between the status information and the performance assurance information, so that a dynamic performance assurance method can be provided for network component management, and network optimization and adjustment, and coordination can be differently adjusted based on different situations, thereby improving network component management efficiency and management flexibility.

In one embodiment, the status information includes at least one of the following: time information, user quantity information corresponding to the network component, target event triggering information, or target event monitoring information.

In one embodiment, a performance of the network component includes at least one of the following: a bandwidth corresponding to the network component, a latency corresponding to the network component, a throughput corresponding to the network component, a coverage corresponding to the network component, a capacity corresponding to the network component, or a service success rate corresponding to the network component.

According to a third aspect, a network device is provided. The network device is configured to perform the method according to any one of the first aspect or the possible implementations of the first aspect. Specifically, the network device includes modules configured to perform the method according to any one of the first aspect or the possible implementations of the first aspect.

For example, the network device according to the third aspect may be a network component management unit.

According to a fourth aspect, a network device is provided. The network device is configured to perform the method according to any one of the second aspect or the possible implementations of the second aspect. Specifically, the network device includes modules configured to perform the method according to any one of the second aspect or the possible implementations of the second aspect.

For example, the network device according to the fourth aspect may be a service management unit.

According to a fifth aspect, a communications system is provided. The communications system includes the network device according to the third aspect and the network device according to the fourth aspect.

According to a sixth aspect, a network device is provided. The network device includes: a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method according to any one of the first aspect or the possible implementations of the first aspect.

For example, the network device according to the sixth aspect may be a network component management unit.

According to a seventh aspect, a network device is provided. The network device includes: a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method according to any one of the second aspect or the possible implementations of the second aspect.

For example, the network device according to the seventh aspect may be a service management unit.

According to an eighth aspect, a communications system is provided. The communications system includes the network device according to the sixth aspect and the network device according to the seventh aspect.

According to a ninth aspect, a computer-readable medium is provided, and is configured to store a computer program. The computer program includes an instruction used to perform the method according to any one of the first aspect or the possible implementations of the first aspect.

According to a tenth aspect, a computer-readable medium is provided, and is configured to store a computer program. The computer program includes an instruction used to perform the method according to any one of the second aspect or the possible implementations of the second aspect.

According to an eleventh aspect, a computer program product including an instruction is provided. When the computer program product is run on a computer, the computer is enabled to perform the method according to any one of the first aspect or the possible implementations of the first aspect.

According to a twelfth aspect, a computer program product including an instruction is provided. When the computer program product is run on a computer, the computer is enabled to perform the method according to any one of the second aspect or the possible implementations of the second aspect.

Compared with the prior art, in the solutions in the embodiments of the present disclosure, the network component management unit obtains the performance assurance information of the network component. The performance assurance information includes the key performance information, the performance assurance priority information, or the performance assurance enabling information. The network component management unit may manage the network component based on the performance assurance information, thereby improving the network component management efficiency.

BRIEF DESCRIPTION OF DRAWINGS

FIG. 3 is a schematic flowchart of a network component management method according to another embodiment of the present disclosure;

DESCRIPTION OF EMBODIMENTS

Figures 1, 2:
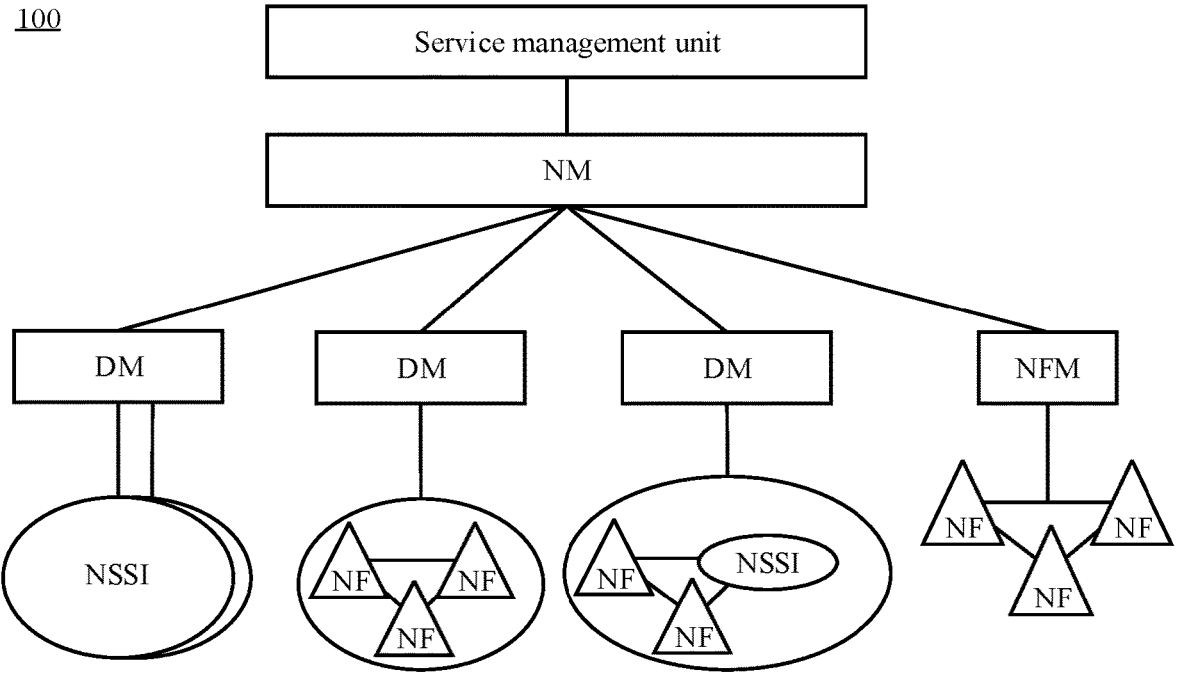
FIG. 1 is a schematic diagram of a network management architecture according to an embodiment of the present disclosure.
FIG. 2 is a schematic flowchart of a network component management method according to an embodiment of the present disclosure.

The following describes the technical solutions of the present disclosure with reference to accompanying drawings.

For ease of understanding of content of the present disclosure, some terms and a network slice management system in this specification are described before descriptions of a method for managing a network slice instance, an apparatus, and a system in the present disclosure.

A network slice (NSL) may also be referred to as a network slice instance (NSI). The network slice is a logical network customized on a physical or virtual network infrastructure based on different service requirements. Alternatively, the network slice may be considered as a combination of network functions and resources that are required for implementing a service or some services. A complete network slice can provide a complete end-to-end network service, and the network resources or functions that form the network slice may include a network slice subnet (NSS) and/or a network function. For example, a network slice may include several network slice subnets, or may include several network slice subnets and a network function that is not classified as a network slice subnet. Alternatively, a network slice may include only several network functions.

For example, the network slice may be a complete end-to-end network that includes a terminal, an access network, a transport network, a core network, and an application server, can provide a telecommunication service, and has a specific network capability. The network slice may alternatively be any combination of the terminal, the access network, the transport network, the core network, and the application server. Features of different network slices and network functions that form the different network slices may be different. Network slices may share some network resources and network functions. The network functions may include a physical network function and/or a virtual network function. A physical network function and/or a virtual network function are/is collectively referred to as a network function in the embodiments of the present disclosure.

A network slice subnet (NSS) may also be referred to as a network slice subnet instance (NSSI). The network slice subnet may not need to provide a complete end-to-end network service. The network slice subnet may be a set formed by network functions of a same device vendor in the network slice, or may be a set of network functions divided based on a domain. For example, the network functions divided based on a domain may include a core-network (CN) network slice subnet, an access-network (AN) network slice subnet, or a transport-network (TN) network slice subnet. Alternatively, the network slice subnet may be a set of any several network functions. For example, these network functions may belong to one or more of an access network, a core network, or a transport network, or may be a set formed in another manner. The network slice subnet may be shared by a plurality of network slices. A network slice may include several network slice subnets, and each network slice subnet may include several network functions and/or several network slice subnets.

A network function (NF) is a processing function in a network, and defines functional behavior and a functional interface. The network function may be implemented by using special-purpose hardware, or may be implemented by running software on special-purpose hardware, or may be implemented in a form of a virtual function on a general-purpose hardware platform. Therefore, from a perspective of implementation, the network function may be classified into a physical network function and a virtual network function. From a perspective of use, the network function may be classified into a dedicated network function and a shared network function. Specifically, a plurality of network slices or network slice subnets may independently use different network functions, and these network functions are referred to as dedicated network functions. Alternatively, the plurality of network slices or network slice subnets may share a same network function, and this network function is referred to as a shared network function. The network function may be any one of the following: a core-network network function, an access-network network function, a transmission unit, or a network element (NE). For example, a base station in a 5th generation (5G) mobile communications system or an evolved NodeB (eNB) in a long term evolution system (LTE) system may all be considered as a network function. The base station in the foregoing 5G system may include a next-generation (NG) base station, a new radio (NR) base station, a 5G (5th generation) base station (gNB), and the like.

A network component may be the foregoing network slice or the foregoing network slice subnet.

It should be understood that terms "slice", "slice instance", "network slice instance", or "network" mentioned in this specification may all be a network slice. The terms "subnet", "sub-network", "network subnet", and "network slice subnet instance" mentioned in this specification may all be a "network slice subnet". In one embodiment, in the embodiments of the present disclosure, a "network slice instance" may be used to represent a "tenant service instance" in some scenarios.

FIG. 1 is a schematic diagram of a network management architecture 100 according to an embodiment of the present disclosure. The following describes functions of modules in FIG. 1.

(a). A service management unit performs service-related management. For example, the foregoing service-related management may include at least one of the following: service operation, service lifecycle management, service fault management, service performance management, charging, customer relationship management, or the like.

For example, the service management unit may be any one of the following units or modules: a service management function (SMF) module, a service management (SM) module, a tenant, a customer, and a business support system (BSS). For ease of description, a unit or module in this specification may be represented only by an English abbreviation of the unit or module. For example, a service management function module may be represented as an SMF, and a representation manner of another unit or module is similar to this representation manner. Details are not described below again.

The SMF may be configured to receive a tenant service requirement, and convert the tenant service requirement into a network slice requirement. For example, a function of the SMF may include one or more of the following: converting a telecommunication service requirement of an operator and/or a third-party customer into a network slice requirement; sending a network slice requirement to a network slice management function (NSMF); and receiving a requirement of an operator and/or a third-party customer for subscripting to network slice management data, and obtaining the network slice management data from an NSMF. For example, the foregoing network slice management data may include performance data, fault data, fault remediation data, and the like. It should be noted that the SM and the SMF may be a same module or different modules.

Specifically, the BSS may be a business management system of an operator, and is responsible for functions such as business contract signing, charging, and service management. The BSS may alternatively include the functions of the SMF.

Alternatively, the service management unit may be directly a tenant or a customer. The foregoing tenant may be one or more network service users who share a set of physical and virtual resources. The tenant may be a renter of an operator network. For example, an electric power company rents an operator network to deploy a smart meter reading service, and the electric power company is a tenant of the operator. The concept of customer is similar to the concept of tenant, and details are not described herein again.

(b). A network management (NM) unit, namely, an NM, may include a part or all of an end-to-end network management function or an end-to-end network orchestration function, and may have some or all of the following functions:

end-to-end network management, for example, network lifecycle management, network template management, network fault management, network performance management, and network configuration management;

mapping between an end-to-end network, a sub-network, and a network function;

coordination of network resources or sub-SLAs provided by different domains, where for example, the different domains may include an access network domain, a core network domain, and a transmission domain;

decomposing network requirement information into subnet requirement information; and uniform orchestration of sub-networks and network functions provided by subdomains, so that the subnets or the network functions provided by different subdomains can meet a target service requirement or a network requirement, for example, a service level agreement (SLA) requirement, a key performance indicator (KPI) requirement, and a quality of service (QoS) requirement.

The foregoing network may also be referred to as a network slice or an end-to-end (E2E) network slice. The foregoing network may include at least a core network (CN) part, an access network (AN) part, and a transport network (TN) part. Alternatively, the foregoing network may include any two of a CN part, an AN part, or a TN part. Alternatively, the foregoing network may include any one of a network of a CN part, a network of an AN part, or a network of a TN part. The foregoing network may include at least one network subnet. Logically, a network is a set of network functions. The network subnet herein may also be referred to as a network slice subnet.

It should be noted that, functions of the NM are mainly described herein, and a name of the NM is not limited. For example, in some embodiments, the NM may also be referred to as a network slice management function (NSMF), a cross-domain management unit, a cross-domain network slice management unit, or another name.

For example, the NM may be an independent management unit, or may be a function of any management unit.

It should be noted that the NM may be included in an operation support system (OSS), or may not be included in the OSS. The OSS may be understood as a support system for device and network maintenance, and is responsible for single-vendor network management or multi-vendor network management.

(c). A domain management (DM) unit, namely, a DM, includes a part or all of a subnet management function or a subnet orchestration function, and may have some or all of the following functions:

domain management, where for example, the domain management may include subnet lifecycle management, subnet fault management, subnet performance management, subnet configuration management, and the like; and the foregoing subnet lifecycle management may include subnet creation, update, or deletion;

service management, where for example, the service management may include service lifecycle management, service fault management, service performance management, and service configuration management; and coordination of network resources, to uniformly orchestrate the network resources, where for example, the foregoing network resources may include a network function or a network element (NE).

It should be noted that, functions of the DM are mainly described herein, and a name of the DM is not limited. For example, the DM may also be a network slice subnet management function (NSSMF), a domain slice management unit, a network slice subnet management unit, or another name.

For example, the DM may be an independent management unit, or may be a function of any management unit.

It should be noted that the DM may be included in the OSS, or may not be included in the OSS.

The foregoing subnet may include one or more of the following: an AN part, a CN part, and a TN part. Alternatively, the foregoing subnet may include a network function or a network element.

For example, when a subnet managed by the DM includes only an AN part, the DM may be referred to as an AN-DM; when a subnet managed by the DM includes only a CN part, the DM may be referred to as a CN-DM; or when a subnet managed by the DM includes only a TN part, the DM may be referred to as a TN-DM. Alternatively, when a subnet managed by the DM includes at least two of an AN part, a CN part, or a TN part, the DM may be referred to as a mix (Mix) DM.

The following separately describes functions of the AN-DM, the CN-DM, and the TN-DM.

(1) An access network domain management (AN-DM) unit has a subnet management function of a network slice in an access network domain and/or a subnet orchestration function of a network slice in an access network domain, and may include some or all of the following functions:

network slice subnet management in an access network domain, where for example, the management includes subnet lifecycle management, subnet fault management, subnet performance management, and subnet configuration management;

service management in an access network domain, where for example, the management includes service lifecycle management, service fault management, service performance management, and service configuration management; and coordination of network resources in an access network domain, to uniformly orchestrate the network resources.

It should be noted that functions of the AN-DM are mainly described herein, and a name of the AN-DM is not limited. For example, the AN-DM may be referred to as an access network subnet management unit, a network slice access network management unit, or another name.

For example, the AN-DM may be an independent management unit, or may be a function of any management unit.

It should be noted that the AN-DM may be included in the OSS, or may not be included in the OSS.

(2) A core network domain management (CN-DM) unit has a network slice subnet management function in a core network domain and/or a network slice subnet orchestration function in a core network domain, and may include some or all of the following functions:

network slice subnet management in a core network domain, where for example, the management includes subnet lifecycle management, subnet fault management, subnet performance management, and subnet configuration management;

service management in a core network domain, where for example, the management includes service lifecycle management, service fault management, service performance management, and service configuration management; and coordination of network resources in a core network domain, to uniformly orchestrate the network resources.

It should be noted that functions included in the CN-DM are mainly described herein, and a name of the CN-DM is not limited. For example, the CN-DM may be referred to as a core network subnet management unit, a network slice core network management unit, or another name.

For example, the CN-DM may be an independent management unit, or may be a function of any management unit.

It should be noted that the CN-DM may be included in the OSS, or may not be included in the OSS.

(3). A transport network domain management (TN-DM) unit, namely, TN-DM, may be a DM that includes a part of or all of a transmission network management function or a transmission network orchestration function, and may have some or all of the following functions:

transmission network part management, where for example, the management may include transmission network part lifecycle management;

transmission network part fault management;

transmission network part performance management;

transmission network part configuration management; and the like.

It should be noted that functions included in the TN-DM are mainly described herein, and a name of the TN-DM is not limited. For example, the TN-DM may be referred to as a transport network subnet management unit, a network slice transport network management unit, or another name.

For example, the TN-DM may be an independent management unit, or may be a function of any management unit.

It should be noted that the TN-DM may be included in the OSS, or may not be included in the OSS.

(d). A network function management (NFM) module may also be referred to as an element management (EM) module, and is configured to manage an NF and/or an NE. The network function management module is a logical entity that may exist independent of the NF/NE, or may be located in the NF/NE, or may be located in another function module; and is configured to manage the NF/NE, for example, manage a lifecycle of the NF/NE, configure a function parameter of the NF/NE, and allocate a network resource to the NF/NE.

In a next generation mobile communications system, tenant service quality assurance and automation are an important feature of a network slice, and automatic network performance optimization is an effective means for assuring tenant service quality. How to automatically optimize or adjust a network based on a real-time network status when the network slice is running is an important problem that network operation and maintenance faces.

In view of this, the embodiments of the present disclosure provide a network component management method and a network device, to improve network component management efficiency, and provide a solution to improve management efficiency for automatic network performance optimization or automatic network performance assurance.

The following further describes the solutions in the embodiments of the present disclosure based on common aspects included in the present disclosure described above.

FIG. 2 is a schematic flowchart of a network component management method 200 according to an embodiment of the present disclosure. The method 200 may be applied to the network management architecture 100 in FIG. 1 or another network management architecture having a same or similar function. When the method 200 is applied to the network management architecture 100, a network component management unit in the method 200 may be the NM, the NSMF, the DM, the NSSMF, the NFM in FIG. 1, or another network module having a same or similar function. A network component in the method 200 may be a network slice, a network slice subnet, or a network function. The method 200 includes the following operations.

Operation S201. The network component management unit obtains performance assurance information of the network component, where the performance assurance information includes at least one of the following: key performance information, performance assurance priority information, or performance assurance enabling information, where the key performance information is used to indicate a key performance of the network component, and the performance assurance enabling information is used to instruct to enable or disable at least one performance assurance function of the network component.

The foregoing performance assurance priority information is used to indicate a priority of at least one performance. The foregoing at least one performance may be at least one performance of the network component. Alternatively, the foregoing at least one performance of the network component may be understood as a performance of a service that is run on the network component. For example, the foregoing performance may include at least one of the following: a bandwidth corresponding to the network component, a latency corresponding to the network component, a throughput corresponding to the network component, a coverage corresponding to the network component, a capacity corresponding to the network component, or a service success rate corresponding to the network component. The foregoing service success rate may be a service uplink success rate or a service downlink success rate.

The foregoing key performance information may be used to indicate the key performance of the network component. The foregoing key performance may be a performance that is of the network component and that needs to be assured. For example, a network component of a URLLC type has a quite high requirement for a low latency, and the key performance information may indicate that a latency performance is a key performance of the network component of the URLLC type. A network component of an eMBB type has a quite high bandwidth requirement, and the key performance information may indicate that a bandwidth performance is a key performance of the network component of the eMBB type.

The foregoing performance assurance function may be a function used to optimize, modify, heal, or assure the performance of the network component. The performance assurance function may include an automatic optimization function of the network component, an automatic healing function of the network component, an assurance function module of the network component, an automatic optimization algorithm of the network component, an automatic healing algorithm of the network component, or an assurance function algorithm of the network component. For example, the foregoing performance assurance function may include a bandwidth assurance function of the network component, a latency assurance function of the network component, a throughput assurance function of the network component, a coverage assurance function of the network component, a capacity assurance function of the network component, a service success rate assurance function of the network component, or a performance assurance function of another network component. For example, the bandwidth assurance function of the foregoing network component may be used to optimize, modify, or assure the bandwidth of the network component. The throughput assurance function of the foregoing network component is used to optimize, modify, or assure the throughput of the network component.

In an example, the performance assurance function may be an SLA automatic assurance function. An SLA may be performance information that is agreed on by an operator and a tenant. For example, the network component management unit in this embodiment of the present disclosure may be a network component management unit operated by an operator. If it is agreed in the SLA that a maximum latency of a service is 10 milliseconds (ms), the network component management unit may set an SLA automatic assurance function when running the network component, to assure that a latency of the network component in an entire running process does not exceed 10 ms. Alternatively, the SLA may be performance information that is agreed on by an operator and a device vendor.

For example, when the foregoing network component management unit is the NM in FIG. 1, the foregoing network component may be a network slice. When the foregoing network component management unit is the DM in FIG. 1, the foregoing network component may be a network slice subnet or a network function.

Operation S202. The network component management unit manages the network component based on the performance assurance information.

In this embodiment of the present disclosure, the network component management unit obtains the performance assurance information of the network component. The performance assurance information includes the key performance information, the performance assurance priority information, or the performance assurance enabling information. The network component management unit may manage the network component based on the performance assurance information, thereby improving network component management efficiency.

In the method 200, the network component management unit may obtain the foregoing performance assurance information in a plurality of manners.

In a manner, the network component management unit may receive the performance assurance information from another network device. For example, when the network component management unit is the NM in FIG. 1, the network component management unit may receive the performance assurance information from the service management unit in FIG. 1. Alternatively, when the network component management unit is the DM or the NFM in FIG. 1, the network component management unit may receive the performance assurance information from the NM in FIG. 1. For example, when the network component management unit is the NM, the service management unit may determine the performance assurance information based on factors such as a current network requirement, a current network status, and a service requirement, and send the performance assurance information to the network component management unit.

In this embodiment of the present disclosure, the network component management unit may receive the performance assurance information from another network device in real time, where the performance assurance information can reflect a current network requirement in real time, so that the network component management unit can flexibly manage the network component based on the performance assurance information sent by the another network device.

In another manner, the network component management unit may obtain a network component template corresponding to the network component, where the network component template includes the performance assurance information. The network component template may include a network slice template (NST), a network slice subnet template (NSST), or a network function template. The network component template may be obtained from another network device, or may be pre-configured in the network component management unit. The foregoing another network device may be the service management unit in FIG. 1, or may be another management unit. The performance assurance information may be predefined in the network component template. For example, if the performance assurance information is the performance assurance enabling information, at least one piece of performance assurance enabling information may be preset in the network component template. Alternatively, it may be understood as initializing at least one performance assurance function of the network component. In an example, the at least one piece of performance assurance enabling information may be set. In an initial status of the network component, states of some performance assurance functions of the network component may be set to enabled, and states of other performance assurance functions of the network component may be set to disabled. For example, a state of the bandwidth assurance function of the network component is set to enabled, and a state of the latency assurance function of the network component is set to disabled. In this way, the network component can optimize, modify, or assure the bandwidth of the network component, and cannot optimize, modify, or assure the latency of the network component. It should be noted that a name of the foregoing network component template is not limited in this embodiment of the present disclosure, and the network component template may be any object that describes the network component. For example, the network component template may also be referred to as a descriptor or a blueprint of the network component.

In this embodiment of the present disclosure, the network component management unit obtains the performance assurance information by using the network component template. The performance assurance information may indicate performance assurance management of the network component in the initial status, so that the performance assurance function of the network component is improved, and network component management efficiency is improved.

In still another manner, the network component management unit may receive the performance assurance reference information of the network component, and obtain the performance assurance information based on the performance assurance reference information. For example, if the network component management unit is the NM in FIG. 1, the network component management unit may obtain the performance assurance reference information from the service management unit in FIG. 1. If the network component management unit is the DM in FIG. 1, the network component management unit may obtain the performance assurance reference information from the NM in FIG. 1. In this manner, instead of directly obtaining the performance assurance information, the network component management unit indirectly obtains the performance assurance information. The performance assurance reference information may be used to indicate a service requirement or a service type of the network component, and the network component management unit may generate the performance assurance information based on the performance assurance reference information. For example, the performance assurance reference information may include but is not limited to at least one of the following: type information of the network component, tenant information corresponding to the network component, service type information corresponding to the network component, or network requirement information of the network component. The network requirement information of the network component may be used to indicate a network requirement. For example, the type information of the foregoing network component may include URLLC, mMTC, eMBB, and the like. For another example, the tenant information corresponding to the network component may include any one of the following: a tenant priority, tenant level information, and a tenant identifier. For still another example, the network requirement information may include at least one of the following: a bandwidth requirement, a latency requirement, a coverage requirement, or another requirement.

In this embodiment of the present disclosure, the network component management unit obtains the performance assurance information based on the performance assurance reference information. To be specific, the network component management unit may flexibly obtain the performance assurance information based on information such as a network requirement and a service type of the network component, to automatically obtain the performance assurance information to manage the network component without needing to obtain particularly designated performance assurance information from another management unit, so that network component management efficiency is improved.

The following describes specific examples of obtaining the performance assurance information based on the performance assurance reference information.

In a specific example, the following describes a case in which the performance assurance reference information includes the type information of the network component. For example, if the performance assurance reference information indicates that the type information of the network component is the URLLC, the URLLC has a high requirement for a low latency. The performance assurance information may instruct, in a plurality of forms, to assure a low latency performance of the network component. In a first form, when the performance assurance information is the key performance information, the performance assurance information may indicate that a latency performance is the key performance. In a second form, when the performance assurance information is the performance assurance priority information, the performance assurance information may indicate that a latency performance is a performance with a highest priority. For example, the performance assurance information may indicate performance priorities of the network component are as follows: latency performance>bandwidth performance>throughput performance. In a third form, when the performance assurance information is the performance assurance enabling information, it may be determined that the performance assurance information may instruct to enable the latency assurance function of the network component. Further, the performance assurance information may also disable another assurance function of the network component. For example, if the URLLC has a relatively low throughput requirement, the performance assurance information may disable the throughput assurance function of the network component. In addition, if the performance assurance reference information indicates that the type information of the network component is another type, for example, eMBB or mMTC, the performance assurance reference information may also be determined in a similar manner. Details are not described herein again.

In another specific example, the following describes a case in which the performance assurance reference information includes the tenant information of the network component. The tenant information may include a tenant priority, tenant level information, or a tenant identifier. For example, if the performance assurance reference information indicates that a first tenant has a high priority, and a second tenant has a low priority, when network resources are limited, the performance assurance information may instruct to assure a performance of a network component corresponding to the first tenant. The performance assurance information may instruct, in a plurality of forms, to assure the performance of the network component corresponding to the first tenant. For example, the performance assurance information may use the key performance information, the performance assurance priority information, the performance assurance enabling information, or the like. For specific content, refer to same or similar content in the foregoing descriptions. For example, refer to the foregoing case in which the performance assurance reference information includes the type information of the network component. Details are not described herein again.

In still another specific example, the following describes a case in which the performance assurance reference information is the network requirement information. For example, if the performance assurance reference information indicates that the network requirement information is that there is a relatively high bandwidth requirement, the performance assurance information may instruct to assure a bandwidth performance of the network component, and the performance assurance information may instruct, in a plurality of forms, to assure the bandwidth performance of the network component. For example, the performance assurance information may use the key performance information, the performance assurance priority information, the performance assurance enabling information, or the like for indication. For specific content, refer to same or similar content in the foregoing descriptions. For example, refer to the foregoing case in which the performance assurance reference information includes the type information of the network component. Details are not described herein again.

In still another specific example, the performance assurance reference information may include a plurality of pieces of information of the type information, the tenant information, the network requirement information of the network component, and the service type information corresponding to the network component. The network component management unit may comprehensively determine the performance assurance information based on the foregoing plurality of pieces of information. For example, the performance assurance reference information may include priority information of a plurality of tenants and network requirement information corresponding to each tenant. For example, network requirement information corresponding to a first tenant is a bandwidth requirement, network requirement information of a second tenant is a coverage requirement, and a priority of the first tenant is higher than a priority of the second tenant. In this case, the performance assurance information may instruct to assure a bandwidth performance requirement corresponding to the first tenant with the higher priority.

In one embodiment, the method 200 may further include: obtaining, by the network component management unit, status information corresponding to the performance assurance information. In other words, the network component management unit obtains a correspondence between the performance assurance information and the foregoing status information. The status information may include network status information or other status information. In this embodiment of the present disclosure, the status information may be used to indicate an application condition of corresponding performance assurance information. In other words, when current status information meets a condition indicated by the status information corresponding to the performance assurance information, the network component management unit may use the performance assurance information to manage the network component. The foregoing current status information may be a current network status. For example, the current status information may include current time information, user quantity information corresponding to a current network component, currently occurred target event triggering information, or currently occurred target event monitoring information.

For example, the performance assurance information may belong to any group of performance assurance information in at least one group of performance assurance information. A correspondence exists between the at least one group of performance assurance information and at least one piece of status information. Alternatively, the performance assurance information may be any piece of performance assurance information in at least one piece of performance assurance information, and a correspondence exists between the at least one piece of performance assurance information and the at least one piece of status information.

For example, the status information may include at least one of the following: time information, user quantity information corresponding to the network component, target event triggering information, and target event monitoring information. The foregoing target event triggering information may indicate occurrence of a target event. For example, for a network slice required by a vehicle to everything (V2X) service, the target event may be an overtaking event. For another example, for an eMBB network slice applied to a stadium scenario, the target event may be whether a current time is a sports game time. The foregoing target event monitoring information may be that it is detected that the target event is being performed. For example, for the network slice of the V2X service, the foregoing target event monitoring information may be distance information between vehicles. For another example, for the eMBB network slice required in the stadium scenario, the foregoing target event monitoring information may include quantity information of connected terminal devices in the stadium.

In this possible implementation described above, the method 200 may further include: determining, by the network component management unit, current status information of the network component; and determining, by the network component management unit, the performance assurance information based on the status information and the current status information.

For example, if there are a plurality of groups of performance assurance information or a plurality of pieces of performance assurance information, the network component management unit may first determine the current status information, and then determine a group of currently used performance assurance information based on a correspondence between the plurality of groups of performance assurance information and the status information. The foregoing current status information may be a current network status. For example, the current status information may include current time information, user quantity information corresponding to a current network component, currently occurred target event triggering information, or currently occurred target event monitoring information.

In a specific example, when the status information is the time information, different time intervals may correspond to different performance assurance information. For example, performance assurance information corresponding to daytime is information indicating that a bandwidth is assured in priority, and performance assurance information corresponding to evening may be information indicating that a latency is assured in priority. The network component management unit determines the currently used performance assurance information based on a time interval to which a current time belongs.

In another specific example, when the status information is the user quantity information corresponding to the network component, different user quantities may correspond to different performance assurance information. For example, when the user quantity is less than a preset threshold, the corresponding performance assurance information may be information indicating that a latency is assured in priority. When the user quantity is greater than the preset threshold, the corresponding performance assurance information may be information indicating that a bandwidth is assured in priority.

In still another specific example, when the status information is the target event triggering information, for example, if the target event is overtaking, when the target event is triggered, the corresponding performance assurance information may be information indicating that a latency is assured in priority.

In still another specific example, when the status information is the target event monitoring information, for example, if the target event is a scenario in which vehicles are in parallel, when the target event is detected, the corresponding performance assurance information may be information indicating that a bandwidth is assured in priority.

In this embodiment of the present disclosure, the status information is introduced, to determine currently used performance assurance information based on a correspondence between the status information and the performance assurance information, so that a dynamic performance assurance method can be provided for network component management, and the network component management unit can perform different optimization and adjustment on the network component based on different situations, thereby improving network component management efficiency and management flexibility.

In one embodiment, in the method 200, the managing, by the network component management unit, the network component based on the performance assurance information may be implemented in the following manner: configuring, by the network component management unit, the performance assurance information in the network component or a managed object of the network component. The managed object of the foregoing network component may be information about the network component maintained by the network component management unit. After obtaining the performance assurance information, the network component management unit may preconfigure the performance assurance information in the network component or the managed object of the network component, so that the network component management unit manages the network component based on the configured performance assurance information in a subsequent process.

In a network component management system, the network component management unit may automatically optimize the network component based on a performance status of the network component. For example, a network slice management unit may automatically adjust a network topology between different network slice subnets or coordinate requirement information between different network slices. A network slice subnet management unit may automatically optimize a network slice subnet based on a performance status of the network slice subnet, for example, automatically adjust a network topology between network functions, a performance of a network function, or a configuration parameter. However, when there are a plurality of network component performance assurance function modules at the same time in the network component management unit, a conflict may occur in a process of modifying the network component performance. For example, in a scenario, if a plurality of performance assurance functions modify a plurality of performances of the network component at the same time, and if a network component management unit selects one of the performances for modification, other important performances may not be assured. For example, if a latency performance of a network component is optimized, a bandwidth performance of the network component may not be assured. For example, in another scenario, if a plurality of performance assurance functions modify a plurality of performances of the network component at different moments, an optimization effect of previous modification may not be assured. For example, for a network component, a latency assurance module in a network component management unit at a moment T1 optimizes a latency of the network component, and at a moment T2 after the moment T1, a bandwidth assurance module in the network component management unit optimizes a bandwidth of the network component, the modification at T2 may result in that the latency modified at T1 cannot be assured.

Therefore, in the method 200, the network component management unit may detect that a plurality of to-be-optimized performances of the network component need to be optimized. In other words, the network component management unit detects a plurality of automatic assurance functions of the network component, and modifies a network topology at the same time. To avoid a conflict that occurs when the plurality of automatic assurance functions are modified, the network component management unit may determine a first performance in the plurality of to-be-optimized performances based on the performance assurance information, and modify the first performance. Therefore, a conflict is avoided when the network component is modified.

In view of this, in the method 200, the managing, by the network component management unit, the network component based on the performance assurance information may be implemented in the following manner: determining, by the network component management unit, at least one to-be-optimized performance of the network component; determining, by the network component management unit, a first performance in the at least one to-be-optimized performance based on the performance assurance information; and optimizing, by the network component management unit, the first performance.

In an example, the performance assurance information may include the performance assurance priority information, where the performance assurance priority information is used to indicate a priority of at least one performance, and the at least one performance includes the at least one to-be-optimized performance. In this example, the determining, by the network component management unit, a first performance in the at least one to-be-optimized performance based on the performance assurance information may include: determining, by the network component management unit based on the performance assurance priority information, a performance that is in the at least one to-be-optimized performance and whose priority meets a preset condition as the first performance.

The foregoing performance whose priority meets the preset condition may be a performance whose priority is higher than a preset level, or may be a performance whose priority falls within a preset range, or may be a performance whose priority is the highest.

For example, the foregoing first performance may be one or more of performances. This is not limited in this embodiment of the present disclosure.

For example, the foregoing performance assurance priority information may indicate that priorities of the plurality of performances of the network component are sorted as follows: latency>bandwidth>throughput.

In this example, the method 200 may further include: determining, by the network component management unit, whether there is a conflict between optimization for the first performance and optimization for a second performance, where the second performance is a performance of last optimization of the network component.

When the optimization for the first performance conflicts with the optimization for the second performance, the network component management unit determines whether a priority of the first performance is higher than a priority of the second performance; and the optimizing, by the network component management unit, the first performance includes: when the priority of the first performance is higher than the priority of the second performance, optimizing, by the network component management unit, the first performance.

In this embodiment of the present disclosure, the performance assurance priority information is introduced, to optimize or modify a performance of the network component, thereby assuring the performance of the network component, reducing a performance optimization conflict, and improving network component management efficiency.

In another example, the performance assurance information may include the key performance information, and the determining, by the network component management unit, a first performance in the at least one to-be-optimized performance based on the performance assurance information may include: when the at least one to-be-optimized performance includes the key performance, determining, by the network component management unit, the key performance as the first performance. The key performance information may be used to indicate a performance that needs to be assured by the network component. For example, the key performance information may instruct to assure the latency performance of the network component.

In this embodiment of the present disclosure, the key performance information is introduced, to optimize or modify a performance of the network component, thereby assuring the performance of the network component, reducing a performance optimization conflict, and improving network component management efficiency.

In still another example, the performance assurance information includes the performance assurance enabling information, and the managing, by the network component management unit, the network component based on the performance assurance information may include: when the performance assurance enabling information is used to enable a first performance assurance function of the network component, enabling, by the network component management unit, the first performance assurance function; or when the performance assurance enabling information is used to disable a second performance assurance function of the network component, disabling, by the network component management unit, the second performance assurance function. For example, the first performance assurance function and the second performance assurance function may include at least one of the following: a bandwidth assurance function of the network component, a latency assurance function of the network component, a throughput assurance function of the network component, a coverage assurance function of the network component, a capacity assurance function of the network component, a service success rate assurance function of the network component, or a performance assurance function of another network component. In one embodiment, the performance assurance enabling information may be preconfigured in the network component template. In one embodiment, the network component management unit may alternatively receive instant performance assurance enabling information from the service management unit. Alternatively, the network component management unit may determine the performance assurance enabling information based on the received performance assurance reference information.

In this embodiment of the present disclosure, the performance assurance enabling information is introduced, to enable and disable a performance assurance function of the network component, thereby assuring a performance of the network component, reducing a performance optimization conflict, and improving network component management efficiency.

For example, if the network component management unit is a network slice management unit, for example, if the network component management unit is an NM or an NSMF, the network component management unit may determine, based on performance assurance information of a network slice, performance assurance information of a network slice subnet included in the network slice, and send the performance assurance information of the network slice subnet to the network slice subnet management unit. The foregoing network slice subnet management unit may be a DM or an NSSMF. Alternatively, the foregoing network slice subnet management unit may be replaced with an NFM, and the foregoing network slice subnet may be replaced with a network function.

For example, the network slice subnet management unit may open different performance assurance information configuration capabilities to the network slice subnet management unit. For example, an attribute of the performance assurance information included in the network slice subnet template may be modified.

In the method 200, when the network component management unit receives the performance assurance information from the another network device, the following further describes the solutions in the embodiments of the present disclosure in detail with reference to FIG. 3.

FIG. 3 is a schematic flowchart of a network component management method 300 according to another embodiment of the present disclosure. The method 300 may be performed by the service management unit in FIG. 1. For content in the method 300 that is the same as or similar to that in the method 200, details are not described herein again. The method 300 includes the following operations.

Operation S301. The service management unit determines performance assurance information of a network component or performance assurance reference information of the network component, where the performance assurance reference information is used to obtain the performance assurance information, and the performance assurance information includes at least one of the following: key performance information, performance assurance priority information, or performance assurance enabling information, where the key performance information is used to indicate a key performance of the network component, and the performance assurance enabling information is used to instruct to enable or disable at least one performance assurance function of the network component.

Operation S302. The service management unit sends the performance assurance information or the performance assurance reference information to a network component management unit that manages the network component.

In this embodiment of the present disclosure, the service management unit determines and sends the performance assurance information of the network component or the performance assurance reference information of the network component to the network component management unit, where the performance assurance reference information is used to obtain the performance assurance information, so that the network component management unit manages the network component based on the performance assurance information, thereby improving network component management efficiency.

For example, in the method 300, the determining, by the service management unit, performance assurance information of a network component or performance assurance reference information of the network component may be implemented in the following manner: receiving, by the service management unit, service requirement information, and obtaining the performance assurance information or the performance assurance reference information based on the service requirement information.

The foregoing service requirement information may be used to indicate a requirement of a service or a tenant. For example, the foregoing service requirement information may include at least one of the following: service type information, service performance information, service priority information, or tenant information.

For example, the foregoing service type information may include an augmented reality (AR) service, a virtual reality (VR) service, a V2X service, a video service, a voice service, a smart home service, a smart factory service, a smart meter reading service, a smart healthcare service, a governmental and enterprise service, a bank system service, and the like. The foregoing service performance information may include QoS, an SLA, and the like of the service. The foregoing service priority information may be used to indicate a priority of the service, for example, may indicate that a priority of the governmental and enterprise service is higher than a priority of the smart home service. The foregoing tenant information may include a priority of the tenant, tenant level information, and the like.

For example, the obtaining the performance assurance information or the performance assurance reference information based on the service requirement information may be converting a requirement of a tenant or a customer for a service into the performance assurance information or the performance assurance reference information associated with the network component. For example, when the service requirement information indicates that a service type is the AR service, the VR service, or the V2X service, the foregoing service has a relatively high latency performance requirement. Therefore, it may be determined that the performance assurance information is used to instruct to assure a latency performance corresponding to the network component. Alternatively, it may be determined that the performance assurance reference information is used to indicate a requirement for a latency of the network component. For another example, when the service type is the video service, there is a relatively high bandwidth requirement. Therefore, it may be determined that the performance assurance information is used to instruct to assure a bandwidth performance of the network component. Alternatively, it may be determined that the performance assurance reference information is used to indicate a requirement for a bandwidth of network component.

In this embodiment of the present disclosure, the service management unit may determine the performance assurance information or the performance assurance reference information of the network component based on the service requirement information of the network component, so that the network component management unit manages the network component based on the performance assurance information, thereby improving network component management efficiency.

For example, the performance assurance reference information includes at least one of the following: type information of the network component, tenant information corresponding to the network component, service type information corresponding to the network component, or network requirement information of the network component. For specific descriptions of the performance assurance reference information, refer to the corresponding content in FIG. 2. Details are not described herein again.

In one embodiment, the method 300 may further include: sending, by the service management unit, first information to the network component management unit, where the first information is used to indicate a correspondence between status information and the performance assurance information. For specific descriptions of the foregoing correspondence, refer to the corresponding content in FIG. 2. Details are not described herein again.

In this embodiment of the present disclosure, the status information is introduced, to determine currently used performance assurance information based on the correspondence between the status information and the performance assurance information, so that a dynamic performance assurance method can be provided for network component management, and network optimization and adjustment, and coordination can be differently adjusted based on different situations, thereby improving network component management efficiency and management flexibility.

For example, the foregoing status information may include at least one of the following: time information, user quantity information corresponding to the network component, target event triggering information, or target event monitoring information. For specific descriptions of the status information, refer to the corresponding content in FIG. 2. Details are not described herein again.

For example, a performance of the network component includes at least one of the following: a bandwidth corresponding to the network component, a latency corresponding to the network component, a throughput corresponding to the network component, a coverage corresponding to the network component, a capacity corresponding to the network component, or a service success rate corresponding to the network component.

Figure 4:
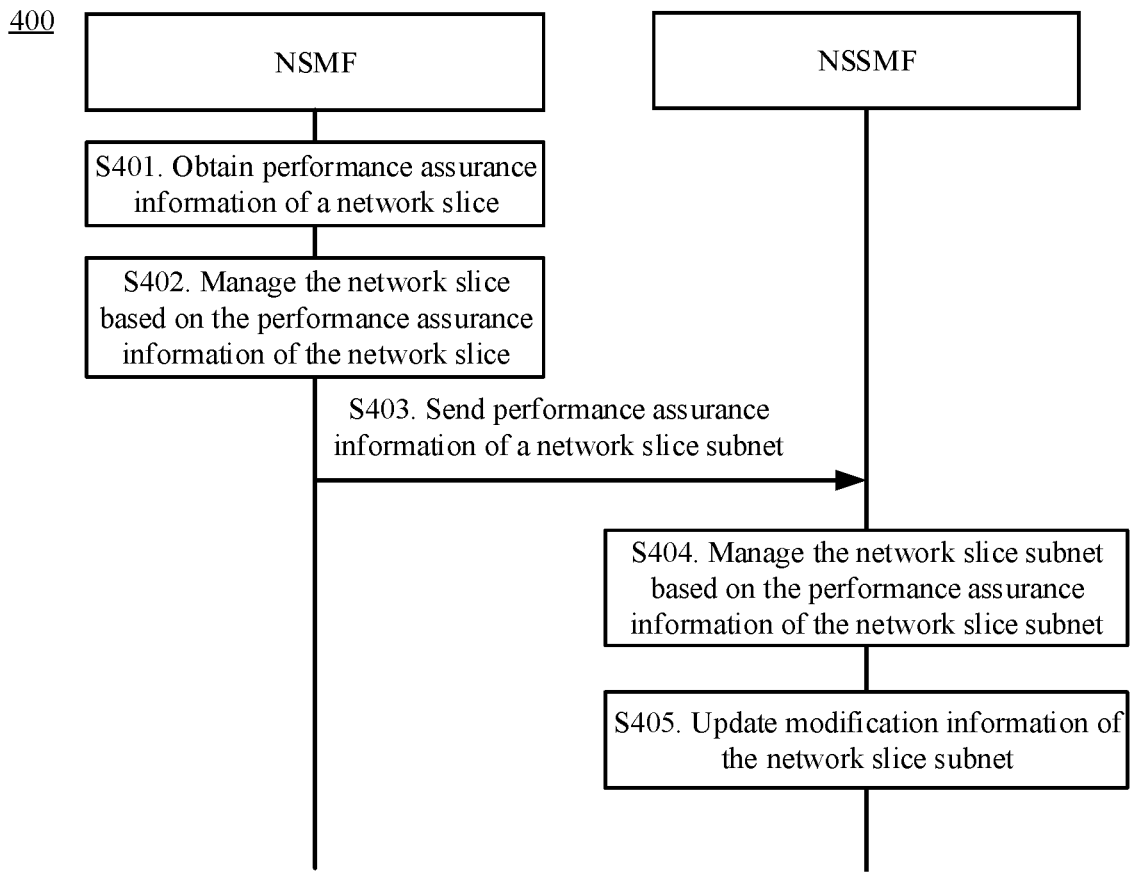
FIG. 4 is a schematic interaction diagram of a network component management method according to still another embodiment of the present disclosure.
Figure 5:
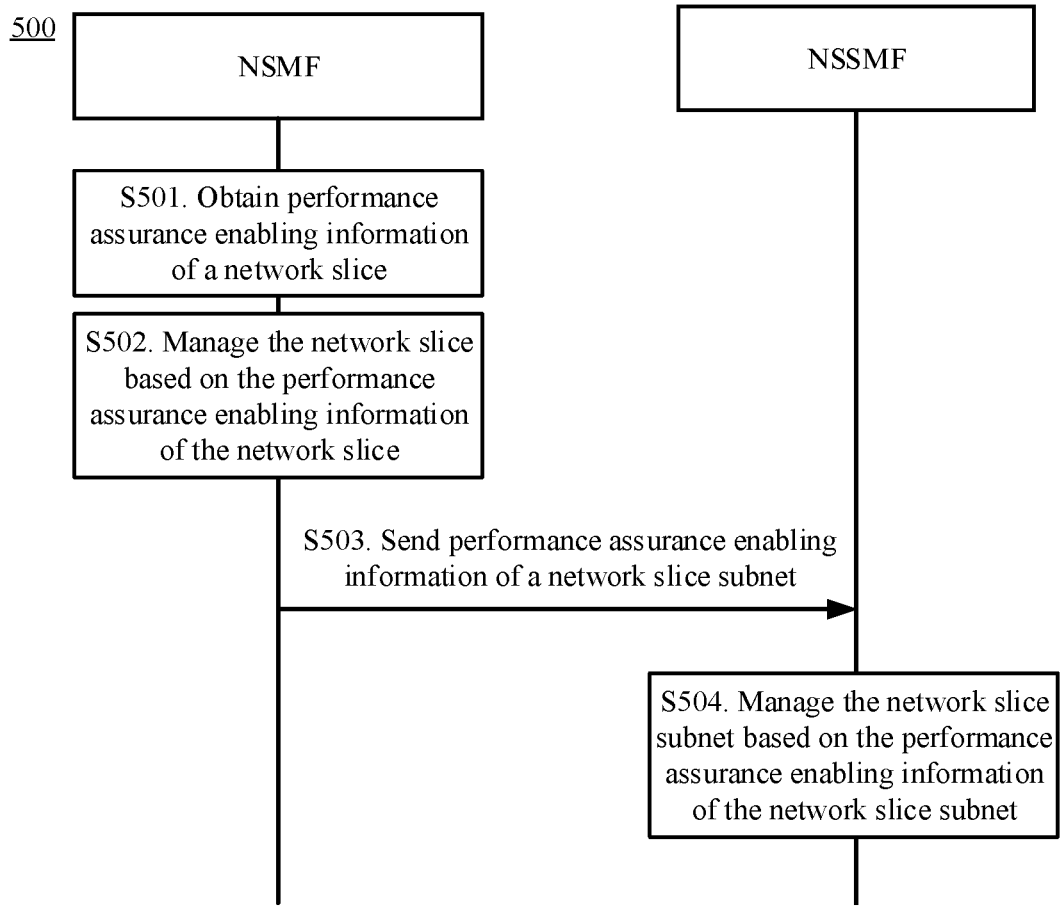
FIG. 5 is a schematic interaction diagram of a network component management method according to still another embodiment of the present disclosure.

The following further describes the solutions in the embodiments of the present disclosure in detail with reference to FIG. 4 and FIG. 5. In FIG. 4 and FIG. 5, the solutions in the embodiments of the present disclosure are described by using an example in which the network component management unit is an NSMF or an NSSMF, and the service management unit is an SM.

FIG. 4 is a schematic interaction diagram of a network component management method 400 according to still another embodiment of the present disclosure. As shown in FIG. 4, the method 400 includes the following operations.

Operation S401. An NSMF obtains performance assurance information of a network slice.

For a specific method for obtaining the performance assurance information by the NSMF, refer to the corresponding content in the example in FIG. 2. Details are not described herein again.

For example, the NSMF may obtain the performance assurance information from an SM.

Operation S402. The NSMF manages the network slice based on the performance assurance information of the network slice.

The NSMF manages the network slice based on the performance assurance information of the network slice. The management mainly includes two manners. A first manner is that the NSMF directly modifies the network slice. A second manner is that the NSMF sends instruction information to an NSSMF, to instruct the NSSMF to modify a topology or a parameter of a network slice subnet.

For example, in the first manner, the NSMF detects that a plurality of SLA automatic assurance functions modify a network topology at the same time, and if a conflict occurs, the NSMF determines, based on configured performance assurance information, to modify a network topology corresponding to a specific performance assurance function. This modification is applicable to a scenario in which the NSMF directly modifies the network slice, for example, a topology architecture between subnets is modified, or the NSMF directly modifies each network element parameter.

For example, in the second manner, an SLA automatic assurance function of the NSMF detects a real-time network status, to determine to configure or modify a network slice subnet or a network function. The NSMF sends a configuration or modification request to the NSSMF or an NFM, where the configuration or modification request carries the instruction information, and the instruction information instructs the NSSMF or the NFM to configure a corresponding SLA automatic assurance function module, for example, may configure a latency assurance module or a bandwidth assurance module.

Operation S403. The NSMF sends performance assurance information of a network slice subnet to the NSSMF.

In one embodiment, the NSMF may obtain the performance assurance information of the network slice subnet based on the performance assurance information of the network slice.

In one embodiment, the NSMF may designate different performance assurance information for different types of subnets. For example, for an AN subnet, the performance assurance information may indicate that performance priorities of the subnet are as follows: latency>bandwidth; for a CN subnet, the performance assurance information may indicate that performance priorities of the subnet are as follows: bandwidth>latency.

Operation S404. After receiving the performance assurance information of the network slice subnet, the NSSMF manages the network slice subnet based on the performance assurance information of the network slice subnet.

If the NSSMF receives modification requests sent by a plurality of SLA automatic assurance functions at the same time in the second manner in S402, in S404, the NSSMF may select a first performance based on the performance assurance information of the network slice subnet for optimization. For a specific method for selecting the first performance, refer to the corresponding content in FIG. 2.

In one embodiment, when receiving the modification request sent by the SLA automatic assurance function, the NSSMF may first query a priority of a previous modified performance; and if the priority of the previous modified performance is higher than a priority of a currently modified performance, and the current modification conflicts with the previous modification, the modification is rejected. If the current modification does not conflict with the previous modification, the modification is accepted.

In one embodiment, the method 400 may further include S405.

Operation S405. After modifying a subnet performance parameter, the NSSMF may update last modified source information of the parameter. In one embodiment, the NSSMF may further store a safety value corresponding to the parameter. The safety value means that when the parameter is in a safety value range, a requirement for the performance is not affected.

In one embodiment, the NSSMF in the method 400 may alternatively be replaced with an NFM.

In this embodiment of the present disclosure, the NSMF and the NSSMF obtain the performance assurance information of the network component. The performance assurance information includes key performance information, performance assurance priority information, or performance assurance enabling information. The network component management unit may manage the network component based on the performance assurance information, thereby improving network component management efficiency.

FIG. 5 is a schematic interaction diagram of a network component management method 500 according to an embodiment of the present disclosure. As shown in FIG. 5, the method 500 includes the following operations.

Operation S501. An NSMF obtains performance assurance enabling information, where the performance assurance enabling information is used to enable or disable at least one performance assurance function of a network slice.

For a specific method for obtaining the performance assurance enabling information by the NSMF, refer to the related content in the example in FIG. 2. Details are not described herein again.

In one embodiment, the NSMF may obtain the performance assurance enabling information from an SM.

For example, the performance assurance function may include a latency assurance function, a bandwidth assurance function, or a capacity assurance function, and instruct to enable or disable the foregoing performance assurance function.

Operation S502. The NSMF enables or disables the at least one performance assurance function of the network slice based on the performance assurance enabling information.

Operation S503. The NSMF sends performance assurance enabling information of a network slice subnet to an NSSMF, to instruct to enable or disable at least one performance assurance function of the network slice subnet.

For example, the performance assurance function may include a latency assurance function, a bandwidth assurance function, or a capacity assurance function, and instruct to enable or disable the foregoing performance assurance function.

The NSMF may determine the performance assurance enabling information of the network slice subnet based on the performance assurance enabling information of the network slice. For example, if the performance assurance enabling information of the network slice instructs to enable the latency assurance function of the network slice, the NSMF may determine that the performance assurance enabling information of the network slice subnet is used to instruct to enable the latency assurance function of the network slice subnet.

Operation S504. The NSSMF enables or disables the at least one performance assurance function based on the performance assurance enabling information.

In this embodiment of the present disclosure, the NSMF and the NSSMF obtain the performance assurance enabling information of the network component. The performance assurance enabling information is used to enable or disable the at least one performance assurance function of the network component. The network component management unit may manage the network component based on the performance assurance enabling information, thereby improving network component management efficiency.

The foregoing mainly describes the solutions provided in the embodiments of the present disclosure from perspectives of different management units and from a perspective of interaction between different management units. It may be understood that, to implement the foregoing functions, the network component management unit or the service management unit includes corresponding hardware structures and/or software modules for performing the functions. With reference to the units and algorithm operations described in the embodiments disclosed in the present disclosure, the embodiments of the present disclosure can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of the present disclosure.

In the embodiments of the present disclosure, the network component management unit, the service management unit, and the like, may be divided into function modules based on the foregoing method examples. For example, the function modules may be obtained through division based on the corresponding functions, or two or more functions may be integrated into one processing module. The integrated module may be implemented in a form of hardware, or may be implemented in a form of a software functional module. It should be noted that the module division in this embodiment of the present disclosure is an example, and is merely logical function division. During actual implementation, another division manner may be used.

Figure 6:
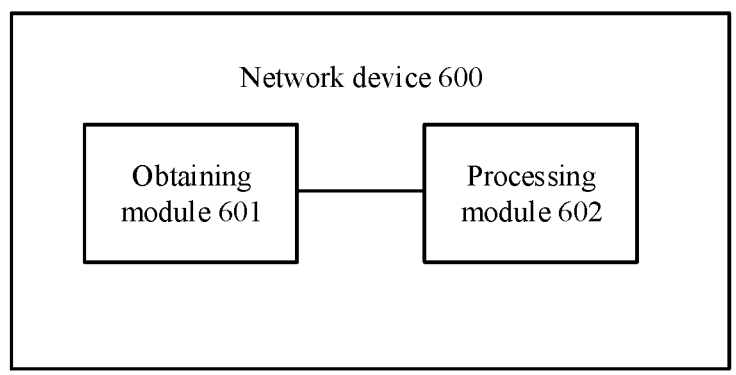
FIG. 6 is a schematic structural diagram of a network device according to an embodiment of the present disclosure.

When different functional modules are used, FIG. 6 is a possible schematic block diagram of a network device 600 according to an embodiment of the present disclosure. The network device 600 may be the network component management unit in FIG. 1 to FIG. 5. The network component management unit may be an NM, an NSMF, a DM, an NSSMF, an NFM, or another module having a same or similar function. The network device 600 can perform the operations performed by the network component management unit in the methods in FIG. 2 to FIG. 5. For example, the network device 600 can perform the processes S201 and S202 in FIG. 2, and the processes S401, S402, S403, S404, and S405 in FIG. 4, the processes S501, S502, S503, and S504 in FIG. 5, and/or other processes of the technology described in this specification.

As shown in FIG. 6, the network device 600 includes:

an obtaining module 601, configured to obtain performance assurance information of a network component, where the performance assurance information includes at least one of the following: key performance information, performance assurance priority information, or performance assurance enabling information, where the key performance information is used to indicate a key performance of the network component, and the performance assurance enabling information is used to instruct to enable or disable at least one performance assurance function of the network component;

and a processing module 602, configured to manage the network component based on the performance assurance information.

Figure 7:
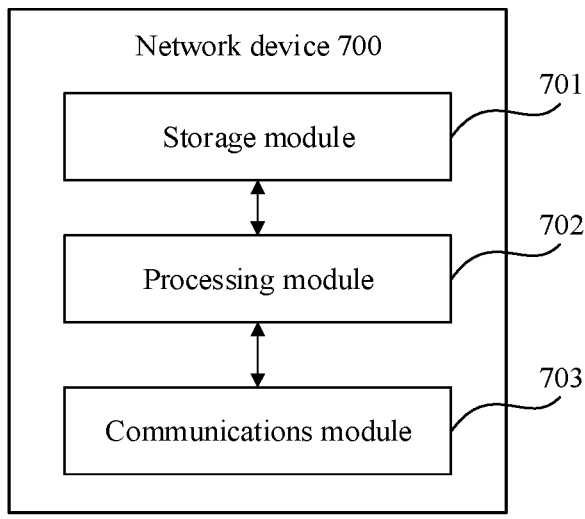
FIG. 7 is a schematic structural diagram of a network device according to still another embodiment of the present disclosure.

When an integrated module is used, FIG. 7 is a possible schematic block diagram of a network device 700 according to an embodiment of the present disclosure. The network device 700 may be the network component management unit in FIG. 1 to FIG. 5. The network component management unit may be an NM, an NSMF, a DM, an NSSMF, an NFM, or another module having a same or similar function. The network device 700 includes a processing module 702 and a communications module 703. The processing module 702 is configured to control and manage an action of the network device 700. For example, the processing module 702 is configured to support the network device 700 in performing the processes 201 and 202 in FIG. 2, the processes S401, S402, S403, S404, and S405 in FIG. 4, the processes S501, S502, S503, and S504 in FIG. 5, and/or other processes of the technology described in this specification. The communications module 703 is configured to support communication between the network device 700 and a service management unit or another device. The network device 700 may further include a storage module 701, configured to store program code and data of the network device 700.

The processing module 702 may be a processor or a controller, for example, may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 703 may be a communications interface, a transceiver, a transceiver circuit, or the like. The communications interface is a general term. During specific implementation, the communications interface may include a plurality of interfaces, for example, may include an interface between the network device 700 and the service management unit and/or another interface. The storage module 701 may be a memory.

Figure 8:
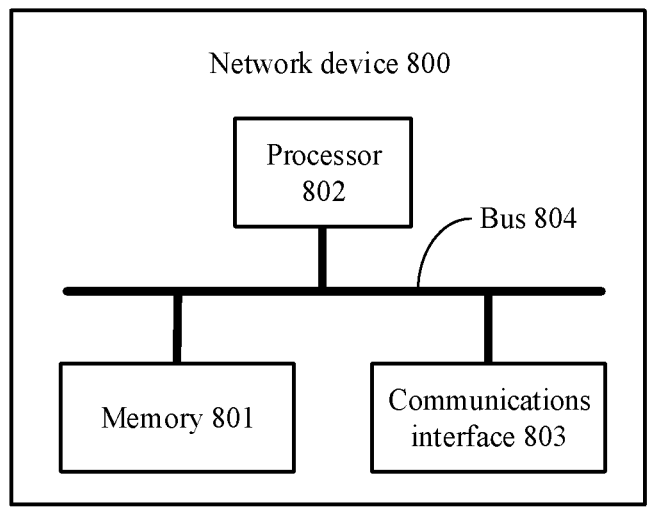
FIG. 8 is a schematic structural diagram of a network device according to still another embodiment of the present disclosure.

When the processing module 702 is a processor, the communications module 703 is a communications interface, and the storage module 701 is a memory, the network component management unit in this embodiment of the present disclosure may be a network device 800 shown in FIG. 8.

Referring to FIG. 8, the network device 800 includes a processor 802, a communications interface 803, and a memory 801. In one embodiment, the network device 800 may further include a bus 804. The communications interface 803, the processor 802, and the memory 801 may be connected to each other by using the bus 804. The bus 804 may be a peripheral component interconnect (PCI) bus, an extended industry standard architecture (EISA) bus, or the like. The bus 804 may be classified into an address bus, a data bus, a control bus, and the like. For ease of representation, only one thick line is used to represent the bus in FIG. 8, but this does not mean that there is only one bus or only one type of bus.

In one embodiment, the network device 800 shown in FIG. 8 may be a chip or a circuit, for example, a chip or a circuit that can be disposed in the network device 800.

For concepts, explanations, detailed descriptions, and other operations that are related to the technical solutions provided in the embodiments of the present disclosure and that are used in the network device 600 in FIG. 6, the network device 700 in FIG. 7, and the network device 800 in FIG. 8, refer to descriptions about the content in the foregoing methods or another embodiment. Details are not described herein.

Figure 9:
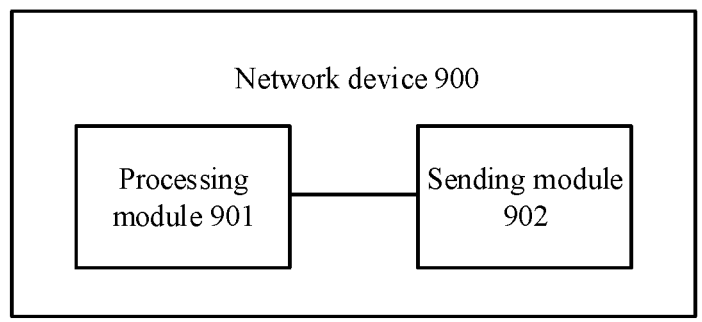
FIG. 9 is a schematic structural diagram of a network device according to still another embodiment of the present disclosure.

When different functional modules are used, FIG. 9 is a schematic block diagram of a network device 900 according to an embodiment of the present disclosure. The network device 900 may be the service management unit in FIG. 1 to FIG. 5. The service management unit may be an SMF, a tenant, a customer, a BSS, or another module having a same or similar function. The network device 900 can perform the operations performed by the service management unit in the methods in FIG. 2 to FIG. 5. For example, the network device 900 can perform S301 and S302 in FIG. 3, the processes performed by the SM in FIG. 4 and FIG. 5, and/or other processes of the technology described in this specification.

As shown in FIG. 9, the network device 900 includes:

a processing unit 901, configured to determine performance assurance information of a network component or performance assurance reference information of the network component, where the performance assurance reference information is used to obtain the performance assurance information, and the performance assurance information includes at least one of the following: key performance information, performance assurance priority information, or performance assurance enabling information, where the key performance information is used to indicate a key performance of the network component, and the performance assurance enabling information is used to instruct to enable or disable at least one performance assurance function of the network component; and a sending module 902, configured to send the performance assurance information or the performance assurance reference information to a network component management unit that manages the network component.

Figure 10:
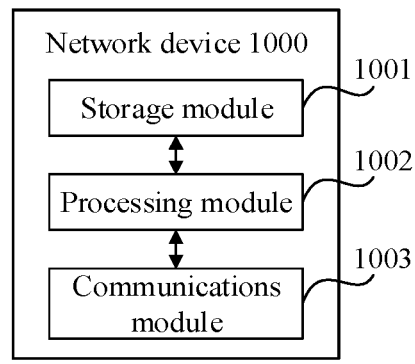
FIG. 10 is a schematic structural diagram of a network device according to still another embodiment of the present disclosure.

When an integrated module is used, FIG. 10 is a possible schematic block diagram of a network device 1000 according to an embodiment of the present disclosure. The network device 1000 may be the service management unit in FIG. 1 to FIG. 5. The service management unit may be an SMF, a tenant, a customer, a BSS, or another module having a same or similar function. The network device 1000 includes a processing module 1002 and a communications module 1003. The processing module 1002 is configured to control and manage an action of the network device 1000. For example, the processing module 1002 is configured to support the network device 1000 in performing S301 and S302 in FIG. 3, the processes performed by the SM in FIG. 4 and FIG. 5, and/or other processes of the technology described in this specification. The communications module 1003 is configured to support communication between the network device 1000 and a network component management unit or another device. The network device 1000 may further include a storage module 1001, configured to store program code and data of the network device 1000.

The processing module 1002 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The communications module 1003 may be a communications interface, a transceiver, a transceiver circuit, or the like. The communications interface is a general term. During specific implementation, the communications interface may include a plurality of interfaces, for example, may include an interface between the network device 1000 and the network component management unit and/or another interface. The storage module 1001 may be a memory.

Figure 11:
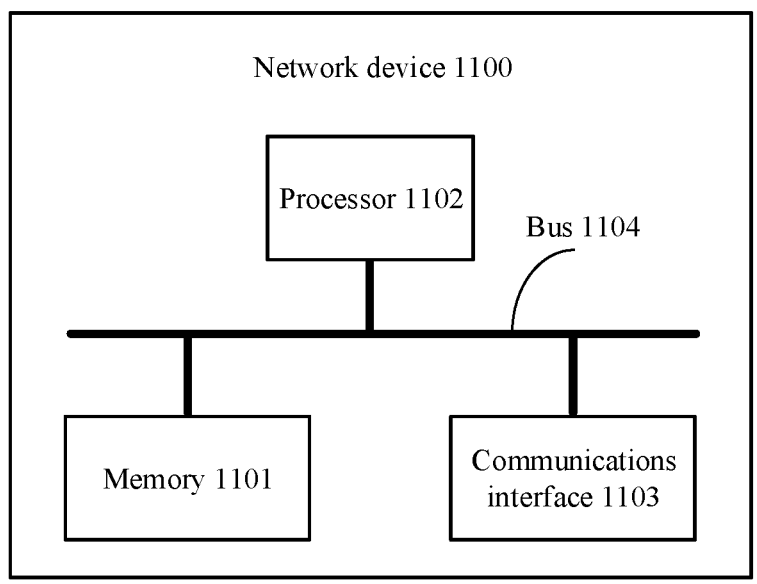
FIG. 11 is a schematic structural diagram of a network device according to still another embodiment of the present disclosure.

When the processing module 1002 is a processor, the communications module 1003 is a communications interface, and the storage module 1001 is a memory, the service management unit in this embodiment of the present disclosure may be a network device 1100 shown in FIG. 11.

Referring to FIG. 11, the network device 1100 includes a processor 1102, a communications interface 1103, and a memory 1101. In one embodiment, the network device 1100 may further include a bus 1104. The communications interface 1103, the processor 1102, and the memory 1101 may be connected to each other by using the bus 1104. The bus 1104 may be a PCI bus, an EISA bus, or the like. The bus 1104 may be classified into an address bus, a data bus, a control bus, and the like. For ease of representation, only one thick line is used to represent the bus in FIG. 11, but this does not mean that there is only one bus or only one type of bus.

In one embodiment, the network device 1100 shown in FIG. 11 may be a chip or a circuit, for example, a chip or a circuit that can be disposed in the network device 1100.

For concepts, explanations, detailed descriptions, and other operations that are related to the technical solutions provided in the embodiments of the present disclosure and that are used in the network device 900 in FIG. 9, the network device 1000 in FIG. 10, and the network device 1100 in FIG. 11, refer to descriptions about the content in the foregoing methods or another embodiment. Details are not described herein.

Methods or algorithm operations described in combination with the content disclosed in this embodiment of the present disclosure may be implemented by using hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a first management unit, a second management unit, or a third management unit. Certainly, the processor and the storage medium may alternatively exist as discrete components in the first management unit, the second management unit, or the third management unit.

A person skilled in the art should be aware that, in one or more of the foregoing examples, the functions described in the embodiments of the present disclosure may be completely or partially implemented by using software, hardware, firmware, or any combination thereof. When the software is used to implement the functions described in the embodiments of the present disclosure, the functions described in the embodiments of the present disclosure may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, (for example, a digital video disc (DVD)), a semiconductor medium (for example, a solid-state drive (SSD)), or the like.

In the foregoing specific implementations, the objectives, technical solutions, and benefits of the embodiments of the present disclosure are further described in detail. It should be understood that the foregoing descriptions are merely specific implementations of the embodiments of the present disclosure, but are not intended to limit the protection scope of the embodiments of the present disclosure. Any modification, equivalent replacement, or improvement made based on technical solutions of the embodiments of the present disclosure shall fall within the protection scope of the embodiments of the present disclosure.

What is claimed is:

1. A network component management method, comprising:
   obtaining, by a network component management unit, performance assurance information of a network component, wherein the network component is a network slice or a network slice subnet, wherein the performance assurance information comprises:
   key performance information indicating key performance information of the network component, wherein the key performance information indicates a key performance of the network component that needs to be assured among multiple performance of the network component, and
   tenant information corresponding to the network component, wherein the tenant information includes a tenant priority, tenant level information, and a tenant identifier; and
   managing, by the network component management unit, the network component based on the performance assurance information.

2. The method according to claim 1, wherein the performance assurance information comprises at least one of the following: type information of the network component, service type information corresponding to the network component, or network requirement information of the network component.

3. The method according to claim 1, wherein the managing, by the network component management unit, the network component based on the performance assurance information comprises:
   configuring, by the network component management unit, the performance assurance information in the network component or a managed object of the network component.

4. The method according to claim 1, wherein the managing, by the network component management unit, the network component based on the performance assurance information comprises:
   determining, by the network component management unit, at least one to-be-optimized performance of the network component;
   determining, by the network component management unit, a first performance in the at least one to-be-optimized performance based on the performance assurance information; and
   optimizing, by the network component management unit, the first performance.

5. The method according to claim 1, wherein the performance assurance information comprises performance assurance enabling information, and the managing, by the network component management unit, the network component based on the performance assurance information comprises:
   when the performance assurance enabling information indicates enabling a first performance assurance function of the network component, enabling, by the network component management unit, the first performance assurance function; or
   when the performance assurance enabling information indicates disabling a second performance assurance function of the network component, disabling, by the network component management unit, the second performance assurance function.

6. The method according to claim 1, wherein a performance of the network component comprises at least one of the following: a bandwidth corresponding to the network component, a latency corresponding to the network component, a throughput corresponding to the network component, a coverage corresponding to the network component, a capacity corresponding to the network component, or a service success rate corresponding to the network component.

7. A network device, comprising:
   a processor; and
   a memory coupled to the processor and having program instructions stored thereon which, when executed by the processor, cause the network device to perform operations comprising:
   obtaining performance assurance information of a network component, wherein the network component is a network slice or a network slice subnet, wherein the performance assurance information comprises:
   key performance information indicating key performance information of the network component, wherein the key performance information indicates a key performance of the network component that needs to be assured among multiple performance of the network component, and
   tenant information corresponding to the network component, wherein the tenant information includes a tenant priority, tenant level information, and a tenant identifier; and
   managing the network component based on the performance assurance information.

8. The network device according to claim 7, wherein the performance assurance information comprises at least one of the following: type information of the network component, service type information corresponding to the network component, or network requirement information of the network component.

9. The network device according to claim 7, wherein the operation of managing the network component based on the performance assurance information comprising:
   configuring the performance assurance information in the network component or a managed object of the network component.

10. The network device according to claim 7, wherein the operation of managing the network component based on the performance assurance information comprising:
    determining at least one to-be-optimized performance of the network component;
    determining a first performance in the at least one to-be-optimized performance based on the performance assurance information; and
    optimizing the first performance.

11. The network device according to claim 7, wherein the performance assurance information comprises performance assurance enabling information, and the operation of managing the network component based on the performance assurance information comprising:
    when the performance assurance enabling information is used to enable a first performance assurance function of the network component, enable the first performance assurance function; or
    when the performance assurance enabling information is used to disable a second performance assurance function of the network component, disable the second performance assurance function.

12. The network device according to claim 7, wherein a performance of the network component comprises at least one of the following: a bandwidth corresponding to the network component, a latency corresponding to the network component, a throughput corresponding to the network component, a coverage corresponding to the network component, a capacity corresponding to the network component, or a service success rate corresponding to the network component.

* * * * *